(12) United States Patent
Litwinowicz et al.

(10) Patent No.: US 10,562,609 B2
(45) Date of Patent: Feb. 18, 2020

(54) HIGH TRIM DEMAND RELIEF

(71) Applicant: SIKORSKY AIRCRAFT CORPORATION, Stratford, CT (US)

(72) Inventors: Anthony Litwinowicz, Derby, CT (US); Kenneth S. Wittmer, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 346 days.

(21) Appl. No.: 15/484,759

(22) Filed: Apr. 11, 2017

(65) Prior Publication Data

US 2017/0291690 A1   Oct. 12, 2017

Related U.S. Application Data

(60) Provisional application No. 62/321,373, filed on Apr. 12, 2016.

(51) Int. Cl.
| | | |
|---|---|---|
| *B64C 13/04* | (2006.01) | |
| *B64C 13/08* | (2006.01) | |
| *B64C 27/57* | (2006.01) | |

(52) U.S. Cl.
CPC ........ *B64C 13/0421* (2018.01); *B64C 13/044* (2018.01); *B64C 13/08* (2013.01); *B64C 27/57* (2013.01)

(58) Field of Classification Search
CPC ..... B64C 13/08; B64C 13/503; B64C 13/504; B64C 13/505; B64C 13/506; B64C 13/507; B64C 13/042; B64C 13/0421; B64C 13/0423; B64C 13/0425; B64C 13/0427; B64C 13/044; B64C 27/54; B64C 27/57

See application file for complete search history.

(56) References Cited

U.S. PATENT DOCUMENTS

| | | | |
|---|---|---|---|
| 5,446,666 A * | 8/1995 | Bauer | B64C 13/503 701/4 |
| 7,742,846 B2 | 6/2010 | Fanciullo et al. | |
| 7,988,089 B2 * | 8/2011 | Wittmer | B64C 27/68 244/17.13 |
| 8,231,085 B2 | 7/2012 | Cherepinsky | |
| 8,684,314 B2 | 4/2014 | Chaduc et al. | |
| 8,948,936 B2 | 2/2015 | Shue et al. | |
| 2013/0261853 A1 * | 10/2013 | Shue | B64C 19/00 701/3 |
| 2013/0325221 A1 | 12/2013 | Shue | |
| 2014/0027565 A1 | 1/2014 | Marvin et al. | |
| 2016/0325830 A1 * | 11/2016 | Waltner | G05D 1/0072 |
| 2017/0017241 A1 * | 1/2017 | Gillett, Jr. | B64C 27/56 |

\* cited by examiner

*Primary Examiner* — Philip J Bonzell
*Assistant Examiner* — Tye William Abell
(74) *Attorney, Agent, or Firm* — Cantor Colburn LLP

(57) ABSTRACT

A flight control system includes a flight control computer operable in a flight state and a ground state. A high demand trim relief logic is operable by the flight control computer in the ground state. The high demand trim relief logic is configured to automatically modify the neutral position of a rotor when a command input to the flight control computer to control the rotor is near an allowable limit.

15 Claims, 4 Drawing Sheets

HIGH TRIM DEMAND RELIEF

CROSS REFERENCE TO RELATED APPLICATIONS

This application claims the benefit of Provisional Application No. 62/321,373, filed Apr. 12, 2016, the contents of which are incorporated by reference in its entirety herein.

BACKGROUND

The subject matter disclosed herein generally relates to an aircraft control system, and more particularly, to a system for trimming control surfaces during transitions between conditions when the aircraft is airborne and when the aircraft is grounded.

Fixed wing and rotary wing aircraft flight control systems include mechanical linkages between the cockpit controls, i.e. the inceptor or pedals, and the controls surfaces associated therewith. Fly-by-wire aircraft control systems which usually employ complex stability augmentation systems have become increasingly common. In fly-by-wire systems, the mechanical links between the cockpit controls and the control surface may be replaced with electronic systems including sensors, logic, and actuators.

Although fly-by-wire flight control systems offer significant improvements over conventional control systems, they additionally present further design challenges. Distinct control law architectures and level stability augmentations exist for both in-flight operation and ground operation of the aircraft. For example, when the aircraft is in contact with the ground, the rotor defaults to a safe, neutral position and the pilot has limited proportional control about that position. Sensors provide information to the control system to determine which flight state the aircraft is in. However, in the event that the sensor information incorrectly identifies the state of the aircraft, it is desirable for the pilot to be able to manually overcome the operational constraints associated therewith.

BRIEF DESCRIPTION

According to one embodiment, a flight control system includes a flight control computer operable in a flight state and a ground state. A high demand trim relief logic is operable by the flight control computer in the ground state. The high demand trim relief logic is configured to automatically modify the rotor neutral position when the pilot inceptor command input to the flight control computer to control the rotor is near its allowable limit.

In addition to one or more of the features described above, or as an alternative, further embodiments the rotor neutral position is shifted in a direction consistent with of the command input.

In addition to one or more of the features described above, or as an alternative, further embodiments the high demand trim relief logic is configured to automatically adjust the neutral trim position of a rotor when the command input is equal to or greater than 75% of the allowable limit.

In addition to one or more of the features described above, or as an alternative, further embodiments in the ground state, the flight control computer is configured to operate proportional control laws.

In addition to one or more of the features described above, or as an alternative, further embodiments the command input is near an allowable limit when a position of a controller associated with the command input is near an end stop of the controller.

In addition to one or more of the features described above, or as an alternative, further embodiments comprising at least one actuator arranged in communication with the flight control computer, at least one actuator is moved in response to said command input.

According to another embodiment, a method of flight includes detecting that a command input to a flight control computer is near an allowable limit and modifying the neutral position of the rotor via a high demand trim relief logic when flight control computer is in a "ground" state.

In addition to one or more of the features described above, or as an alternative, further embodiments the rotor neutral position is redefined in a direction consistent with the command input.

In addition to one or more of the features described above, or as an alternative, further embodiments the high demand trim relief logic is configured to automatically adjust a rotor neutral position of a rotor when the command input is equal to or greater than 75% of the allowable limit.

In addition to one or more of the features described above, or as an alternative, further embodiments in the ground state, the flight control computer is configured to operate proportional control laws.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
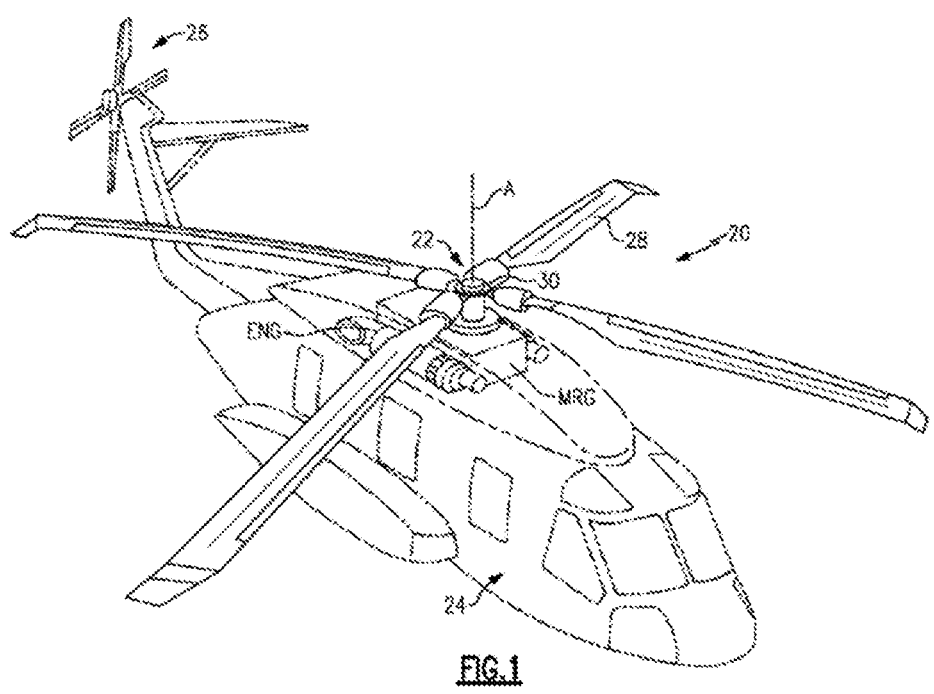
FIG. 1 is a perspective view of an example of a rotary wing aircraft.

FIG. 1 schematically illustrates an example of a vertical take-off and landing (VTOL) rotary wing aircraft 20. The aircraft includes a main rotor system 22 supported by an airframe 24 having an extending tail which mounts an anti-torque system 26, such as a tail rotor system. While shown as an anti-torque system 26, it is understood the anti-torque system 18 can be a translational thrust system, a pusher propeller, a rotor propulsion system, and the like in addition to or instead of the shown anti-torque system. The main rotor system 22 includes a plurality of rotor blade assemblies 28 mounted to a rotor hub 30. The main rotor assembly 22 is driven about an axis of rotation A through a main gearbox MRG by one or more engines ENG. The main gearbox MRG may be interposed between the one or more engines ENG, the main rotor system 22, and the anti-torque system 26. The main gearbox MRG is mechanically connected to the main rotor system 22 and to the anti-torque system 26 so that the main rotor system 22 and the anti-torque system 26 may both be driven by the main rotor gearbox MRG. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the disclosure.

Figure 2:
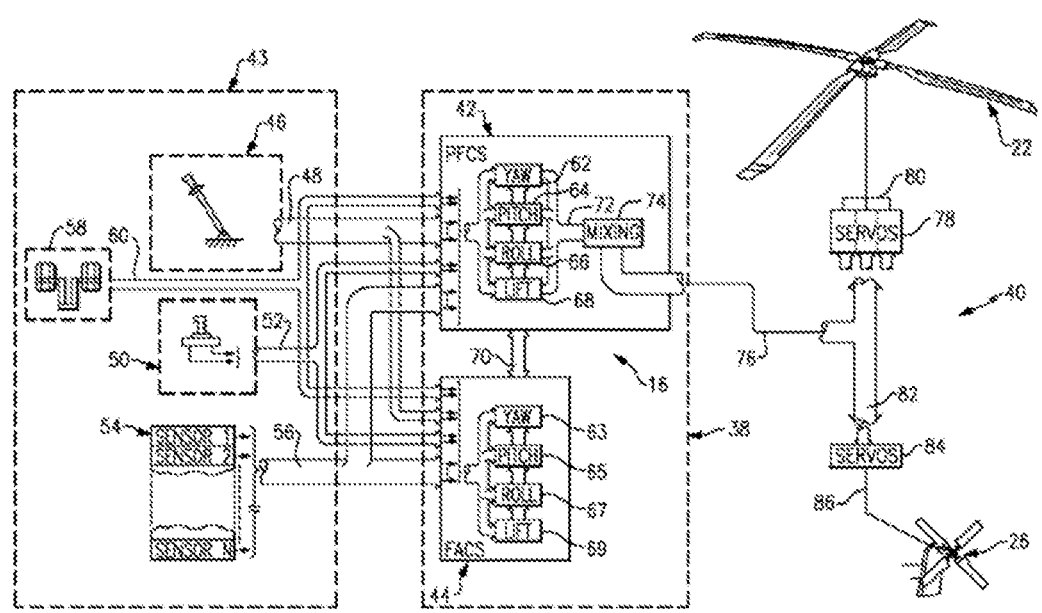
FIG. 2 is a schematic diagram of a flight control system of an aircraft.

Referring now to FIG. 2, an example of a fly-by-wire type flight control system 40 is illustrated in more detail. The flight control system 40 processes controller inputs and sensor data and transmits the resultant signals to the aircraft 20 primary servos 78, 84 via electrical/fiber optic paths. The processing is typically digital, but may be analog. The flight control system 40 may, in one non-limiting embodiment, include a Flight Control Computer (FCC) 38 which provides control laws operable to combine aircrew commands with other system commands, for example an external or separately partitioned set of control laws that provide manual and/or automatic mission specific flight logic modes, and sensor data to generate servo commands to control the aircraft 20. The FCC 38 implements a control law structure that embodies a desired aircraft response model and the control paths to drive the aircraft 20 to follow that response In the illustrated, non-limiting embodiment of FIG. 2, the FCC 38 includes a Primary Flight Control System (PFCS) 42 and an Automatic Flight Augmentation and Cuing System (FACS) 44. The PFCS 42, as a minimum, is the flight critical portion of the flight control system 40. The PFCS 42 may also provide stability and control augmentation and additional mission-critical/aiding control laws to enhance the handling qualities of the aircraft. The FACS 44 provides mission facilitating control laws. The FACS 44 is typically implemented in a separate software partition or processor from the PFCS 42.

The PFCS 42 and FACS 44 receive input command signals from a, collective controller 46 on line 48, a cyclic controller 50 on line 52, and the aircraft's sensed parameter signals from sensor suite 54, on lines 56, and a yaw pedal controller 58 on lines 60. Cockpit controllers located in the cockpit of the aircraft 20 are operated manually by the aircrew and may take various forms including, but not limited to, collective stick systems, sidearm controller systems, yaw pedal systems or other such controllers which may alternatively be located within the aircraft itself and may alternatively or additionally be remotely located to control an unmanned or manned aircraft system.

The PFCS 42 and. FACS 44 may each contain separate flight control law models for controlling the yaw, pitch, roll and till axes of the aircraft. The models are included in the PFCS 42 and FACS 44 (schematically represented by modules 62, 64, 66, 68 for the PFCS 42 and modules 63, 65, 67, 69 for the FACS 44). The sensed parameter signals from aircraft sensors suite 54, provide the PFCS 42 and FACS 44 with the aircraft's angular rate and attitude response to the rotor command signals. The PFCS 42 is operable to execute an explicit model-following algorithm to provide a rate command/attitude hold (RC/AH) response in the pitch, roll, and yaw axes. The PFCS 42 provides rotor command signals and the FACS 44 provides conditioning of the PFCS 42 four axis logic functions to facilitate, for example only, autopilot capabilities.

The PFCS 42 and FACS 44 modules are interconnected through bus 70 to provide rotor command signals on output lines 72 to a mixing function 74 which communicates commands on lines 76 for the displacement of the main rotor servo system 78 and linkages 80 to control the tip path plane of the main rotor system 22.

A mixed command signal is also provided on line 82 to the tail rotor servo system 84 to control the thrust of the anti-torque system 26 through linkages 86. In a rotary-wing aircraft, the servo system produces changes in hydraulic, electrical or mechanical actuation systems that alter the flight control surfaces such as main rotor collective pitch, lateral cyclic pitch, longitudinal cyclic pitch, and tail rotor pitch. In a fixed wing aircraft, the servo system produces changes in hydraulic, electrical or mechanical actuation system the actuators manipulate flight control surfaces such as a rudder, elevators, and ailerons.

One or more controllers 46, 50, 58 of the fly-by-wire flight control system 40 are "unique trim" controllers. Unique trim permits a flight control system (stick) which need not be proportional to the controller position but remains in a center (detent) position unless a maneuver is being commanded. The FCC 38 provides unique trim based on a rate commanded by the pilot. For example, the FCC will hold the attitude commanded when the stick is returned to the detent and the attitude error will drive the trim command. This differs from proportional control in which the stick position corresponds directly to swashplate angle, and the pilot's control stick may be physically retained in place by a retention system such as a magnetic brake mechanism which the pilot may selectively activate/release. When operated in proportional control, the trim changes proportionally to the displacement of the stick.

In flight, trim operates well because the aircraft 20 responds to the change in swashplate angle, causing the flight path to change correspondingly. Attitude or velocity hold feedbacks change the trim position and typically act on the attitude of the aircraft so the aircraft maintains the state (attitude or velocity) where it is put after a control input. Workload for the pilot is reduced because there is no longer a requirement to push a button to cause a maneuver and find the proper location to maintain the new state (attitude). The total amount of control travel is also reduced because proportionality is not required.

When the aircraft is grounded, or at least partially in contact with the ground, trim changes from attitude or velocity hold feedbacks may hinder control of the aircraft 20 because the ground may resist motion of the aircraft. In other words, if the control laws are of the type that hold attitude, and the ground changes that attitude, the attitude feedback would drive trim to "run away" trying to satisfy the attitude reference which cannot be met since the aircraft is constrained. This may result in excessive control movement, for example, excessive swashplate angle, which may create problems with the aircraft 20 while on the around, e.g. dynamic rollover.

Upon detection that the aircraft 20 is in a "ground" state, the flight control system 40 operates using corresponding ground state control laws. In one embodiment, weight-on-wheels (WOW) switches on the landing gear are used to convey to the flight control system 40 that the aircraft 20 is in a ground contact state and selectively disable the functions that can change trim and drive trim to a neutral position. In one embodiment, the functions that can change trim are disabled as appropriate by axis. It should be understood that other types of sensors 54 may be used in place of or in conjunction with the WOW switches to determine whether the aircraft 20 is in a "flight" state or "ground" state.

The aircraft flight control system 40 then operates with proportional control laws such that the pilot stick inputs are essentially directly correlated to control displacement. That is, the pilot commands swashplate angle as related to the amount of stick input applied out of detest. In addition, operation of the aircraft 20 in a "ground" state causes the main rotor system 22 of the aircraft 20 to move trim to a stored "rotor neutral" position and the pilot is able to command movement of the rotor with limited authority about that trim rotor neutral position.

One of the cockpit controllers commonly included in a rotary wing aircraft is a beeper. The beeper is movable from a neutral position, to either a forward, aft, left, or right position. When the aircraft is in "ground" mode, actuation of the beeper may be used to shift the rotor neutral position in the pitch and roll axes. For example, each movement of the beeper from the neutral position to one of the forward, aft, left or right positions is configured to slew the rotor neutral position at a defined rate in a corresponding direction. Thus, if the aircraft is in a "ground" mode, and the pilot needs additional control, the pilot may manually shift the rotor neutral position by repeatedly operating the beeper to incrementally slew the rotor neutral position to a desired position. This manual operation of the beeper is labor intensive and requires additional time, making use of the beeper to adjust the rotor neutral position cumbersome.

Figure 3:
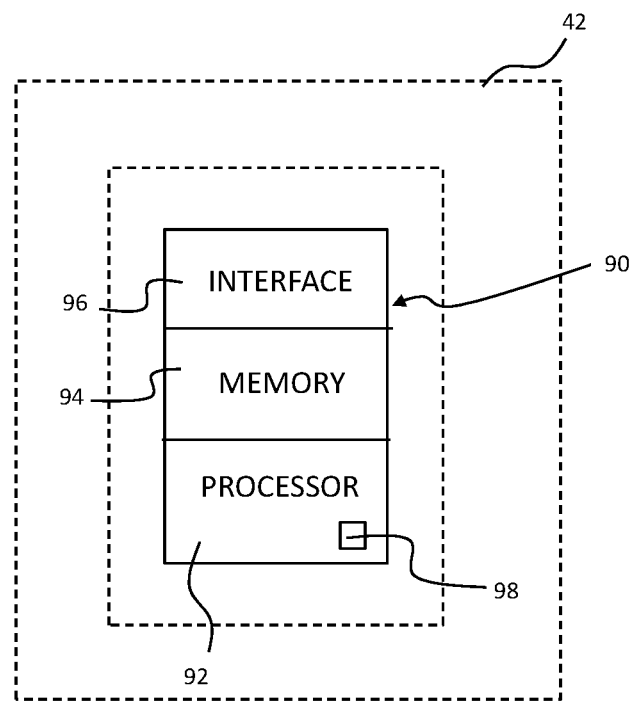
FIG. 3 is a schematic diagram of a module operable to execute a high demand trim relief logic according to an embodiment.

With reference now to FIG. 3, a module 90 within the PFCS 42 may be utilized to automatically execute a high demand trim relief logic 98 to provide a pilot with greater control when the control system 40 is operating in the ground state. The module 90 may include a processor 92, a memory 94, and an interface 96. The processor 92 may be any type of known microprocessor having desired performance characteristics. The memory 94, may for example, be selected from a UVPROM, EEPROM, FLASH, RAM, ROM, DVD, CD, a hard drive, or other computer readable medium which stores the data and logic 98 described herein.

Figure 4:
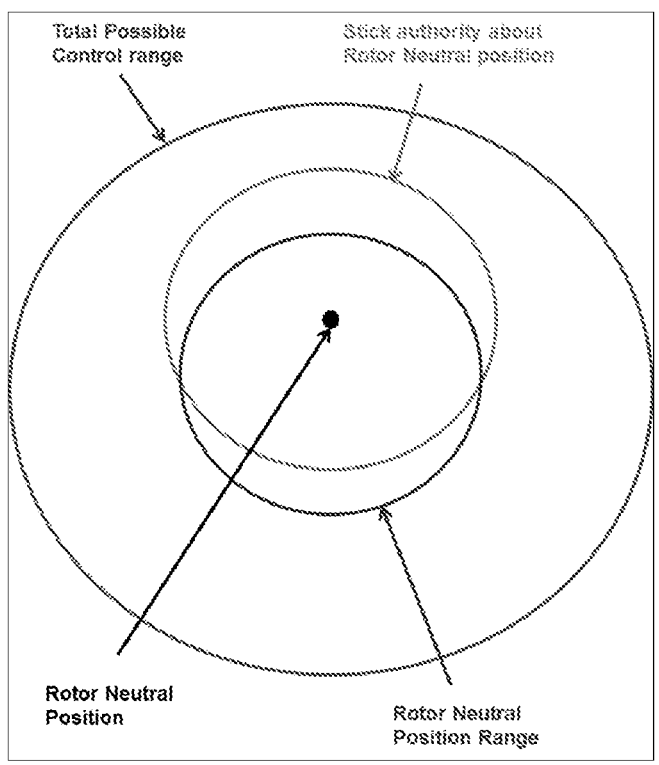
FIG. 4 is a schematic diagram of the range of rotor neutral positions and the level of stick control associated therewith according to an embodiment.

The high demand trim relief logic 98 is configured to change the rotor neutral position, if necessary, when the flight control system is in a ground state, to reduce the movement of the stick needed to maintain a desired rotor position. The high demand trim relief logic 98 monitors the position of a corresponding pilot controller, such as the cyclic stick for example, relative to the total range of motion of the pilot controller. As the position of the stick approaches an end stop such that only a limited portion of the stick authority is available, the high demand trim relief logic 98 will redefine the rotor neutral position in the direction commanded (see FIG. 4). In one embodiment, the high demand trim relief logic 98 is programmed to redefine the rotor neutral position if the stick command exceeds and is held at a position of equal to or great than 75% of the available stick authority. In other embodiments, the trim will be adjusted proportionally to the stick displacement when the stick position exceeds a predefined limit such that the one or more warnings are provided to the pilot that the stick is near the control limit.

The rotor neutral position is configured to migrate or follow the stick as a function of the stick displacement beyond the point where the trim relief is initialed. Usually as the rotor neutral position moves in a direction consistent with the stick, the pilot will start to return the stick to detent because less displacement of the stick is required to maintain a desired rotor position. Further, once the stick is back within the control limits, the high demand trim relief will turn off and the rotor neutral position is fixed at the new position.

A flight control system 40 including the high demand trim relief logic 98 disclosed herein is able to provide trim follow-up at desired times, such as when the aircraft is in flight, but is stuck in a "ground" state. Under such circumstances, the high demand trim relief logic increases the allowed control range accessible by a pilot. In the event that the flight control system 40 incorrectly detects that the aircraft is in a "ground" state, such as if one or more of the WOW switches is jammed for example, inclusion of the high demand trim relief logic 98 will provide a pilot with the necessary control to safely operate the aircraft. Because the high demand trim relief logic 98 automatically adjusts the rotor neutral position in response to a primary pilot controller, the need for a pilot to use a secondary action, such as a beeper to incrementally adjust the rotor neutral position, is eliminated.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A flight control system, comprising:
    a flight control computer operable in a flight state and a ground state;
    a pilot control operably coupled to the flight control computer; and
    a demand trim relief logic operable by the flight control computer when in the ground state, the demand trim relief logic being configured to automatically modify a neutral position of a rotor when a command input to the flight control computer via the pilot control, to control the rotor is equal to or greater than 75% of an allowable limit.

2. The flight control system according to claim 1, wherein the rotor neutral position is shifted in a direction consistent with the command input.

3. The flight control system according to claim 1, wherein in the ground state, the flight control computer is configured to operate proportional control laws.

4. The flight control system according to claim 1, wherein the command input is near an allowable limit when a position of a controller associated with the command input is near an end stop of the controller.

5. The flight control system according to claim 4, further comprising at least one actuator arranged in communication with the flight control computer, at least one actuator being moved in response to said command input.

6. A method of flight, comprising:
    adjusting a pilot control operably coupled to a flight control computer;
    detecting that a command input to the flight control computer via the pilot control is equal to or greater than 75% of an allowable limit; and
    modifying a neutral position of a rotor via a demand trim relief logic when the flight control computer is in a ground state.

7. The method according to claim 6, wherein the neutral position of the rotor is redefined in a direction consistent with the command input.

8. The method according to claim 6, wherein in the ground state, the flight control computer is configured to operate proportional control laws.

9. A method of flying an aircraft, comprising:
receiving, at a flight control system, a signal indicating an operational status of the aircraft, wherein the signal indicating the operational status of the aircraft is incorrect;
operating the flight control system in response to the signal when the aircraft is in flight;
providing a command input to a flight control computer;
detecting that the command input to the flight control computer is near an allowable limit; and
modifying a neutral position of a rotor via a demand trim relief logic.

10. The method according to claim 9, wherein the demand trim relief logic is configured to shift the rotor neutral position in a direction consistent with the command input.

11. The method according to claim 9, further comprising moving at least one actuator in response to said command input, wherein at least one actuator is arranged in communication with the flight control computer.

12. The method according to claim 9, wherein a weight-on-wheels switch is configured to provide a signal to the flight control system indicating that the aircraft is in a ground state.

13. The method according to claim 12, wherein the weight-on-wheels switch is jammed in a ground state position.

14. The method according to claim 9, wherein the demand trim relief logic is configured to automatically modify the neutral position of the rotor when the command input is equal to or greater than 75% of an allowable limit.

15. The method according to claim 14, wherein the command input is near the allowable limit when a position of a controller associated with the command input is near an end stop of the controller of the flight control system.

* * * * *